Patented Apr. 22, 1952

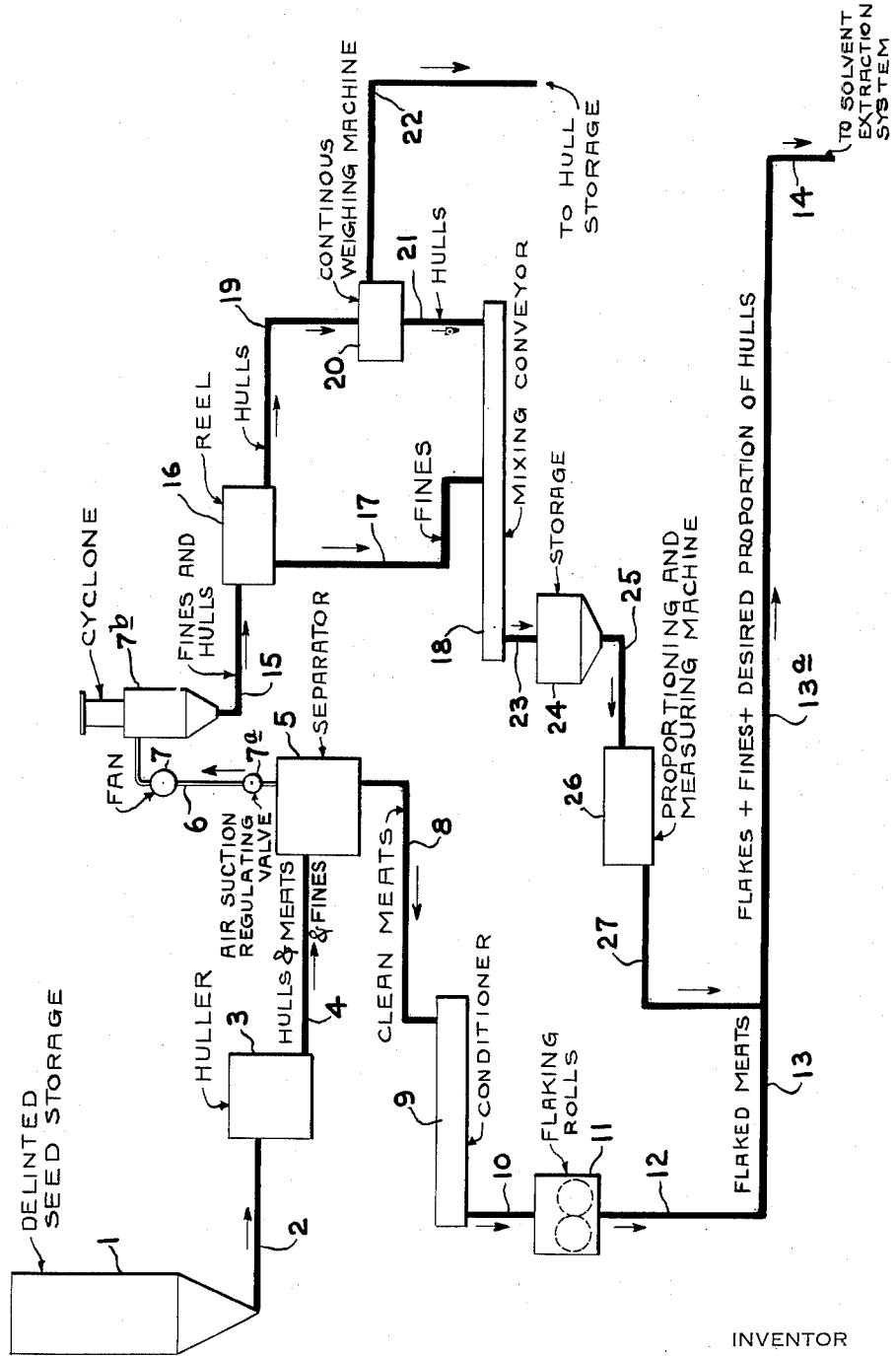

2,594,117

UNITED STATES PATENT OFFICE 2,594,117

PREPARED COTTON SEED MATERIAL FOR SOLVENT EXTRACTION AND PROCESSES FOR PREPARATION AND SOLVENT EXTRACTION OF COTTON SEED MATERIALS

Michele Bonotto, Princeton, N. J.

Application July 3, 1948, Serial No. 36,866

7 Claims. (Cl. 260—412.4)

This invention relates to improvements in prepared cotton-seed materials for solvent-extraction and processes for preparation for solvent extraction of cotton-seed materials.

It is necessary, in order to extract oil from cotton-seed by solvent extraction, to initially prepare the material for the extraction system so as to enable the solvent to percolate through such material as freely as possible, and heretofore it has been the general practice to follow, more or less, the well known pattern or method practiced in the preparation for extraction of soy beans. In this method, the soy beans are cracked by suitable mechanism and the resulting hulls and broken beans are together in such cracked condition conveyed into and through a conditioner in which, in order to soften the contained protein and to give the product a plastic quality, the said broken beans including the hulls are warmed up or heated to a temperature from 160° F. to 180° F. The material so treated and conditioned is then passed through smooth rolls and flaked thereby to the desired thickness. The desired thickness of this flaked material may vary from $7/1000$ to $13/1000$ of an inch or more.

Similarly, cotton-seeds are conventionally cracked, the hulls are broken, the cotton-seed meal thus cracked is passed through a separator to separate by suitable regulation of the air-suction a part of the hulls and bran from the meats. Such separation is usually accomplished by air-suction and the meats coming from the hullers and the hull-separators are conveyed through a meat-conditioner and there heated up to between 160 and 180° F. This heated material is then passed through flaking rolls and flaked to the desired thickness. It is common practice in the cotton-seed crushing industry so to regulate the hull-separators that a percentage of hulls are left with the kernels or meats of the seeds for the purpose of adjusting the percentage of protein in the cake after the oil has been pressed out. The quantity of hulls so left with the kernels or meats will depend upon the ammonia content required in the cake by the feed market, and the desired amount of hulls that is to be left with the kernels is obtained by regulating the velocity of the suction air in the hulls-separators.

While in processing cotton-seed for oil extraction by presses it is desirable and necessary to leave in the cake a certain percentage of hulls in order to facilitate the percolation of oil through the cake in the presses, in the solvent extraction processes those hulls constitute an inert material which when conveyed with the meats into the extractor reduces its over-all capacity. Attempts have been made, therefore, to separate as many hulls as possible by increasing the velocity of the suction air during the hull-separating step, but while a large percentage of hulls may be thus separated a large percentage of fine particles of meat will also in this operation be simultaneously separated. These fine particles of the cotton-seed meat or kernels are inevitably produced during the cracking of the seeds, and such fine particles of meat of various sizes so separated contain approximately 32% of oil and the procedure last above described has been found objectionable because of the resulting loss of oil.

It is generally known that one of the main reasons why extractors of the design known in the art as the Paternoster type (in which screen baskets containing a charge of the material to be extracted are subjected to a spray of solvent) are inefficient in the extraction of cotton-seed is because the solvent cannot freely percolate through the conventionally-flaked cotton-seed material that comprises the layer of extraction material in the screen baskets of such apparatus. Such failure to freely percolate is due to the character of the prepared material of such layer of flakes when treated in accordance with prior art practices.

My present invention comprises the production of prepared cotton-seed material for solvent extraction and the utilization of a process for the preparation of such material that will overcome the objections hereinabove specified and result in a more efficient and economical solvent extraction of cotton-seed. This process consists in the separating of as many hulls as possible in the hull separator regardless of the quantity of fine particles that may be simultaneously separated from the body of meats. This separation may thus be accomplished with a high degree of efficiency and results in the separation and elimination from the meats of a maximum percentage of the hulls. This separated body of cotton-seed meats containing the minimum amount of hulls and fines is then conveyed to and through a conventional conditioner which raises the temperature of the conditioned cotton-seed meats to a degree varying from 160° to 180° F., and this meat body with said minimum amount of hulls and fines is then sent to the flaking rolls in a conventional way to produce flakes of the desired thickness, and these flakes having a maximum percentage of the cotton-seed meat are passed and moved in a continuously conveyed stream to the solvent extraction system, but between such flaking and delivery to the extractor, the stream is treated as hereinafter stated.

In accordance with my invention, and preferably in a continuation of the separating process hereinabove referred to, the fines are independently separated from the hulls through the use of a shaker or screen reel to provide a body of reel-separated hulls with a minimum amount of fines and a body of reel-separated fines or fine cotton-seed meat particles. A predetermined percentage of the body of reel-separated hulls (which as aforesaid contain a minimum amount of fine meat particles), preferably by weighing the same with a suitable weighing machine, will be mixed with the load of fines from the separator and this mixture of independently reel separated fines and reel separated hulls is then fed and distributed into the stream of flaked meats which are being conveyed, as aforesaid, to a solvent extractor or extraction system, where the oil content of said mixture is extracted therefrom by percolation therethrough of a conventional oil-extraction solvent, such as paraffin hydrocarbons, alcohols, chlorinated hydrocarbons or mixtures thereof. The proportion of the hulls thus passed into the flaked meats body is suitably calculated to bring down the protein content of the solvent-extracted meal to the percentage desired, and it will be seen that in accordance with this process the hulls will by-pass the flaking rolls and will consequently not be flaked or pressed into the flaked meats.

My new method of preparing cotton-seed for solvent extraction and the prepared cotton-seed material produced thereby will provide a big advantage over prior art processes because the hulls in unflaked and uncompressed form are uniformly mixed in the desired proportion with the flaked meats and the production of this prepared cotton-seed product will greatly facilitate the percolation of solvent through the mass in any form of solvent extractors, but particularly in continuous solvent extractors, and will greatly increase the efficiency of extractors of the aforesaid Paternoster type. This procedure is of especially great advantage when used in connection with the continuous filter-feeder arrangement described in applicant's Patent No. 2,370,138. In utilizing the preferred form of apparatus shown and described in the Patent No. 2,370,138 cotton-seed material prepared in accordance with my present invention will be loaded in a run-around chain conveyor which conveys such prepared cotton-seed material for extraction into the extraction column proper.

While no important difficulty in percolating the solvent through cotton-seed material in countercurrent is experienced in the use of an extraction column of the type described in my Patent No. 2,156,236, such percolation in the filter-feeder is sometimes not uniform when in accordance with prior art processes hulls are flaked with the meats. On the contrary, rapid and efficient percolation will be obtained when unflaked hulls are, in accordance with my present invention, mixed with the flaked cotton-seed meats as hereinabove described.

With these and other objects in view the invention comprises the product composed of the prepared mixture of cotton-seed materials for solvent extraction and the steps in the process or method so combined as to co-act and cooperate with each other in the performance of the functions and the accomplishment of the results herein contemplated, and the steps in the process comprise in one of the adaptations of my invention the species or preferred form illustrated in the accompanying drawing.

The figure of the drawing is a diagrammatic view illustrating the steps and the method for carrying out a preferred form of my invention.

Referring now to the accompanying drawing, in accordance with the preferred form of my invention, the cotton-seed material in its whole delinted form is stored in the tank 1 designated in the drawing "Delinted seed storage," and is suitably conveyed through line 2 to and through a conventional huller 3 in which the seeds are cracked to produce hulls, bran, relatively large meat or kernel particles and fines. These hulls, bran, large meat or kernel particles and fines are then conveyed or fed by line 4 to a conventional separator 5 to which by air line 6 is connected a fan 7 and an air-suction regulating valve 7a. This device is set so as to remove by suction from the material in the separator a maximum percentage of the fines and hulls and to leave therein the cotton-seed kernel particles which are specified in the drawing as "clean meats." The fines and the hulls are then discharged through the cyclone 7b, collected and sent to the reel 16.

In prior art processes, the air in the separator 5 is so regulated as to separate a part only of the hulls from the relatively large meats. In accordance with my invention, I separate in the separator 5 by the air regulating device 7a as many of the hulls as is possible to separate without regard to the quantity of fines or fine particles that may accompany the hulls and be simultaneously separated from the body or relatively large meats in the separator 5. Because of the combined separation of both hulls and fines, this step of separation may be accomplished with a higher degree of efficiency and the maximum percentage of the hulls may be procured in this separation and elimination from the clean meat particles of such hulls. These clean-meat particles—thus separated and containing the minimum amount of hulls and fines—are then through lines 8 fed into and through a conventional conditioner 9 in which the temperature of the clean meats is raised to a degree varying from 160 to 180° F. This conditioner softens the contained protein and gives the product a plastic quality, and this softened and plastic material is then fed through line 10 to and through flaking rolls 11 by which the conditioned clean meat is suitably rolled to produce flakes of a desired thickness which may vary from $7/1000$ to $13/1000$ of an inch or more. This flaked material, which as aforesaid embodies a maximum percentage of clean cotton-seed meat is fed, in the embodiment shown, by line 12 to a conveyor 13 from which, after further preparation by the addition thereto of suitable amount or mixture of fines and hulls, which will now be described, is fed by line 14 to a solvent extraction system or solvent extractor which may be of the Paternoster type as hereinabove stated, or may be of the type shown and described in my earlier Patent No. 2,156,536. Such completely prepared mixture will also be of especially great advantage for use in connection with the continuous filter feeder arrangement shown and described in my earlier Patent No. 2,370,138.

In accordance with the preferred form of my invention the clean flaked meats passing through the line 13 will have added thereto in unflaked and unconditioned form a calculated proportion of fines and hulls which are preferably initially thoroughly mixed together as hereinafter described.

Thus, in accordance with my preferred form of process or method, the fines and hulls comprising the maximum amount that may in the separating process be produced by air suction or other conventional means are contemporaneously with the conditioning and flaking of the large clean meats, passed as aforesaid from the cyclone by lines 15 to a separating screen-reel 16 which provides an independent separation of the hulls and fines. A beater or other conventional machine adapted to free the fines adhering to the hulls may also if desired be used and inserted in the line 15 so as to act upon the material before delivery thereof to the reel or shaker 16. From this screen reel 16 the independently-separated fines are passed through lines 17 directly to a mixing conveyor 18 while the hulls separated by such screen reels are preferably passed through lines 19 to a continuous weighing machine 20 and a weighed proportion of the hulls, which is calculated to provide the desired proportionate amount of such hulls, is passed by line 21 to the said mixing conveyor 18, while the balance of such hulls and bran is passed by lines 22 to a suitable hull storage and dsiposed of. The said fines and weighed proportion of hulls are thus mixed together to provide a predetermined mixture of hulls and fines which are then preferably by line 23 passed to the storage receptacle 24, from which storage receptacle the material may be passed by lines 25 to a proportioning-and-measuring machine 26 and thereafter from this machine a measured and properly proportioned quantity is passed through lines 27 to the line 13 in which, in the part 13ᵃ, the flaked and conditioned meats will be subsequently mixed with the mixture of hulls and fines comprising all the fines that were initially or originally separated by the initial separating device 5 and subsequently independently reel-separated, together with a desired and weighed proportion of the hulls also originally or initially separated by said separating device 5 and subsequently independently reel-separated. This finally-prepared mixture of flaked meats, plus the unflaked fines and plus the desired proportion of unflaked hulls will then, as aforesaid, by line 14 be passed to the solvent extraction system.

It will be seen that the fines and particularly the hulls separated in and by the device 5 will by-pass the conditioner and the flaking rolls and any desired proportionate mixture of such unconditioned and unflaked hulls in their raw condition may, with the fines, be fed to the flaked clean meats, and the proportion of such hulls is calculated to bring down the protein content of the solvent extracted meal to the desired percentage.

Having described my invention, I claim:

1. A prepared cotton-seed material for solvent extraction comprising a mixture composed of fragmentary portions of cotton-seed and formed of the flaked cotton-seed kernel particles which are substantially free from cotton-seed hulls combined with a predetermined proportion of the hard-surfaced unflaked segmental pieces of the hulls of said cotton-seed in cup form and uniformly mixed with said flaked kernel particles, said hard-surfaced unflaked segmental pieces of the hulls in cup form providing in the composite mixture isolated cup-shaped voids between the flaked kernel particles.

2. A prepared cotton-seed material for solvent extraction as claimed in claim 1 in which the fines from said cotton-seed kernel are also added to said mixture in unflaked form.

3. A process for the preparation and solvent extraction of cotton-seed materials consisting in cracking the cotton-seed hulls into hard-surfaced, unflaked segmental pieces of cup form to release the meat kernels therefrom, separating the meat kernels from the said segmental pieces of the hulls, flaking the separated meat-kernel material, independently mixing with said flaked meat-kernel material a predetermined proportionate amount of said segmental hull pieces in their raw cup form to cause said segmental pieces of cup form to provide between the flaked heat particles of the composite mixture isolated cup-shaped voids and to serve as a solvent percolation aid in the subsequent extraction from said composite material of oil by the use of solvent, and extracting the oil from said mixture by a percolation therethrough of a conventional oil-extraction solvent.

4. A process for the preparation and solvent extraction of cotton-seed materials consisting in cracking cotton-seed hulls into unflaked segmental pieces of cup form to release the meat kernels therefrom, separating the meat kernels from the said segmental pieces of the hulls, flaking the separated kernel material, continuously moving said flaked material in a pre-extraction conveying movement and independently mixing with said flaked material a predetermined proportionate amount of said unflaked segmental hull pieces in raw cup form during said pre-extraction conveying movement to cause said unflaked segmental cup-form pieces of hulls to provide between the flaked meat particles of the mixture isolated voids and to serve as a solvent percolation aid in the subsequent extraction from said composite material of oil by the use of solvent, and extracting the oil from said mixture by a percolation therethrough of a conventional oil-extraction solvent.

5. A process for preparation and solvent extraction of cotton-seed materials consisting in cracking cotton-seed hulls into unflaked segmental pieces of cup form, conjointly separating to a maximum degree the segmental pieces of the hulls and the fines from the meat kernel fragments, flaking the separated meat-kernel material, continuously moving said flaked meat-kernel material in a pre-extraction movement, independently separating said fines from the hulls and mixing with said flaked meat-kernel material a predetermined proportionate amount of said independently-separated segmental hulls in raw cup form during said pre-extraction movement to cause said segmental cup-form hulls to provide voids between the flaked meat particles of the mixture and to serve as a solvent-percolation aid in the subsequent extraction of oil from said material by the use of solvent, and extracting the oil from said mixture by a percolation therethrough of a conventional oil-extraction solvent.

6. A process for the preparation and solvent extraction of cotton-seed materials consisting in cracking cotton-seed hulls into unflaked segmental pieces of cup form, initially conjointly separating to a maximum degree the said segmental pieces of the hulls and the fines from the meat-kernel material, flaking the separated meat-kernel material, continuously moving said flaked meat-kernel material in a pre-extraction conveying movement, independently separating the fines from the hulls, mixing with said flaked meat-kernel material a predetermined proportionate amount of said independently-separated unflaked segmental hull pieces in raw cup form during said pre-extraction conveying movement to cause said unflaked segmental pieces of hulls of cup-form to provide between the flaked meat-kernel particles of the mixture isolated voids and to serve as a solvent percolation aid in the subsequent extraction from said composite material of oil by the use of solvent, also mixing with said flaked meat-kernel material the fines in unflaked form during such pre-extraction movement thereof, and extracting the oil from said mixture by a percolation therethrough of a conventional oil-extraction solvent.

7. A process for preparation and solvent extraction of cotton-seed materials as claimed in claim 6 in which the independently separated fines and the calculated proportion of raw hulls in cup form are independently mixed together again before final mixing with the flaked meat-kernel material.

MICHELE BONOTTO.

REFERENCES CITED

The following references are of record in the file of this patent:

UNITED STATES PATENTS

| Number | Name | Date |
|---|---|---|
| 675,422 | Stanley | June 4, 1901 |
| 691,342 | Johnson | Jan. 14, 1902 |
| 734,239 | Pratt | July 21, 1903 |
| 825,534 | Hawk | July 10, 1906 |
| 1,121,913 | French | Dec. 22, 1914 |
| 1,928,241 | Barton | Sept. 26, 1933 |
| 2,489,599 | Trottman | Nov. 29, 1949 |